Patented July 11, 1933

1,917,443

UNITED STATES PATENT OFFICE

SEBASTIAN GASSNER AND WILHELM MEISER, OF LEVERKUSEN-I. G.-WERK, GERMANY, ASSIGNORS TO GENERAL ANILINE WORKS, INC., OF NEW YORK, N. Y., A CORPORATION OF DELAWARE

AZODYESTUFF

No Drawing. Application filed September 29, 1931, Serial No. 565,928, and in Germany October 22, 1930.

The present invention relates to the manufacture of new azodyestuffs and to the fibers dyed therewith, more particularly it relates to dyestuffs which may be represented by the probable general formula:

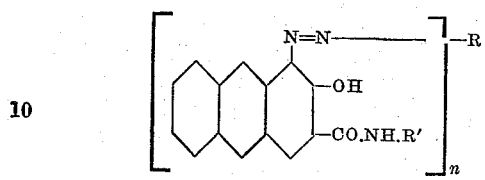

wherein "$n$" stands for one of the numbers one and two, R stands for a radical of a diazotization component suitable for producing azodyestuffs, R' stands for a benzene or naphthalene nucleus, and wherein R and R' may be substituted by any substituents with the exception of a group inducing solubility in water, such as the sulfonic acid group and the carboxylic acid group. As substituents coming into consideration for the purpose of our invention there may be mentioned by way of example halogen, alkyl, alkoxy, the nitro group, the nitrile group, the carboxylic acid amide group, the sulfone-amide group and a substituted amino group, such as —NH.CO.alkyl, —NH-aroyl, —NH.alkyl and —NH.aryl.

As diazotization components there may be mentioned, for example, amines of the benzene and naphthalene series, aminoanthraquinones, aminocarbazoles, aminodiphenylamines, aminodiphenyls and benzidines.

The new dyestuffs are obtainable by coupling either on the fibre or in substance or on a substratum, a diazetized amine with a 2-hydroxy-3-carboxylic acid arylamide (compare our copending application Ser. No. 565,927, filed Sept. 29, 1931, entitled "New anthracene derivatives") according to the method known for the manufacture of the dyestuffs from 2.3-hydroxynaphthoic acid arylamide.

The invention is illustrated by the following examples, without being limited thereto:

*Example 1.*—50 grams of cotton are impregnated with an aqueous solution of 0.6 grams per litre of 2-hydroxyanthracene-3-carboxylic acid anilide and developed in a diazo bath made up from 6 grams per litre of 4-amino-4'-methoxydiphenylamine, rinsed and soaped. A dark green dyeing is obtained. The dyestuff has the following formula:

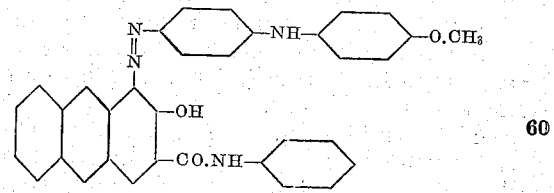

*Example 2.*—When the cotton (50 grams) impregnated with 0.7 grams per litre of 2-hydroxyanthracene-3-carboxylic acid-o-toluidide is developed in a diazo bath (neutralized in the customary manner) made up from 2 grams per litre of 1-amino-4-benzoyl-amino-2.5-diethoxy-benzene, rinsed and soaped, a clear bluish green is obtained. The dyestuff has the following formula:

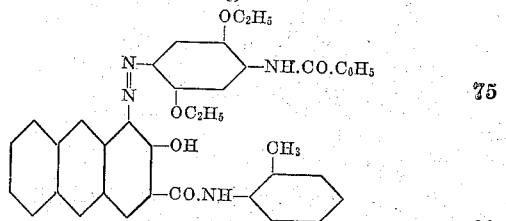

*Example 3.*—When the material impregnated in accordance with Example 2 is developed in a diazo bath (neutralized in the customary manner) made up from 2 grams per litre of 5-chloro-2-toluidine, rinsed and soaped, a reddish violet results, while the combination of the same base with the o-toluidide of 2-3-hydroxynaphthoic acid yields a red. The dyestuff has the following formula:

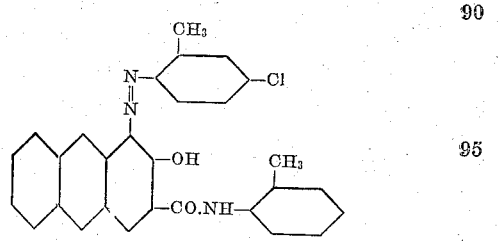

*Example 4.*—32.7 parts by weight of 2-hydroxyanthracene-3-carboxylic acid-o-toluidide are made into a paste with 1000 parts of water and the equivalent quantity of caustic soda (calculated on the hydroxyl), and 20 grams of sodium acetate are added. To this solution is added slowly while stirring at 50° C., a diazo solution obtained in the customary manner from 27.2 parts by weight of 1-amino-4-benzoylamino-2.5-diethoxybenzene. The azodyestuff having the following formula:

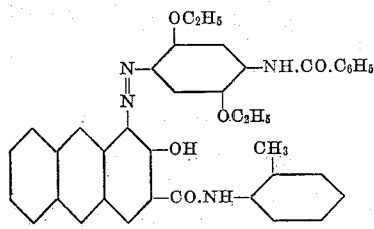

separates immediately in bluish green flakes in a substantially pure state. After working up in the customary manner a greenish blue powder is obtained, which can be used as a pigment dyestuff, for example, for the manufacture of lacquers.

*Example 5.*—When the cotton (50 grams) impregnated with 1 gram per litre of 2-hydroxyanthracene-3-carboxylic acid-o-anisidide is developed in a diazo bath made up from 3.12 grams per litre of 4-nitrobenzeneazoaminohydroquinonedimethylether, rinsed and soaped, a greenish black is obtained. The dyestuff has the following formula:

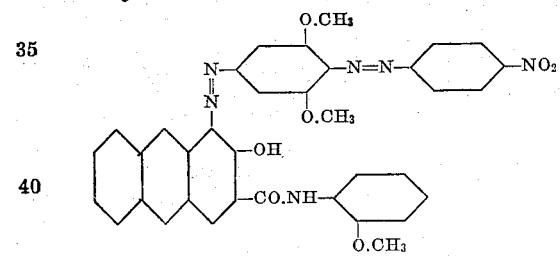

We claim:

1. As new products azodyestuffs of the probable general formula:

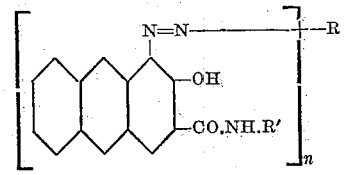

wherein "$n$" stands for one of the numbers 1 or 2, R stands for a radical of a diazotization component suitable for producing azodyestuffs, R' stands for a benzene or naphthalene nucleus and wherein R and R' may be substituted by substituents selected from the group consisting of halogen, alkyl, alkoxy, the nitro group, the nitrile group, the carboxylic acid amide group, the sulfone-amide group and a substituted amino group.

2. As new products azodyestuffs of the probable general formula:

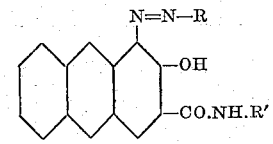

wherein R stands for a radical of a diazotization component suitable for producing azodyestuffs, R' stands for a benzene or naphthalene nucleus and wherein R and R' may be substituted by substituents of the group consisting of halogen, alkyl, alkoxy and the nitro group.

3. As a new product the azodyestuff of the following formula:

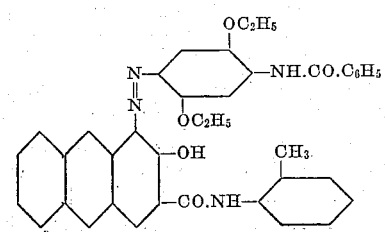

dyeing the vegetable fibre clear bluish green shades of good fastness properties.

4. Fiber dyed with a dyestuff as claimed in claim 1.

5. Fiber dyed with a dyestuff as claimed in claim 2.

6. Fiber dyed with the dyestuff as claimed in claim 3.

In testimony whereof, we affix our signatures.

SEBASTIAN GASSNER.
WILHELM MEISER.